(12) United States Patent
Fortmeier et al.

(10) Patent No.: US 11,230,151 B2
(45) Date of Patent: Jan. 25, 2022

(54) MOTOR VEHICLE CONTROL ARM

(71) Applicant: Benteler Automobiltechnik GmbH, Paderborn (DE)

(72) Inventors: Günter Fortmeier, Delbrück (DE); Frank Höcker, Ibbenbüren (DE); Matthias Körner, Schloß Holte-Stukenbrock (DE); Stephan Meyer, Bielefeld (DE); Alex Mirau, Hövelhof (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 80 days.

(21) Appl. No.: 16/774,114

(22) Filed: Jan. 28, 2020

(65) Prior Publication Data
US 2020/0247204 A1    Aug. 6, 2020

(30) Foreign Application Priority Data

Jan. 31, 2019 (DE) .................... 10 2019 102 493.5

(51) Int. Cl.
*B60G 7/00* (2006.01)
*B60G 7/02* (2006.01)

(52) U.S. Cl.
CPC .............. *B60G 7/001* (2013.01); *B60G 7/02* (2013.01); *B60G 2204/1244* (2013.01); *B60G 2206/10* (2013.01); *B60G 2206/7101* (2013.01); *B60G 2206/7102* (2013.01); *B60G 2206/73* (2013.01); *B60G 2206/81012* (2013.01)

(58) Field of Classification Search
CPC .. B60G 7/001; B60G 7/02; B60G 2204/1244; B60G 2206/81012; B60G 2206/7102; B60G 2206/7101; B60G 2206/73; B60G 2206/10; B60G 7/006
See application file for complete search history.

(56) References Cited

U.S. PATENT DOCUMENTS

| | | | | |
|---|---|---|---|---|
| 6,082,721 A * | 7/2000 | Kingsley | ............... | F16B 11/008 267/276 |
| 6,126,155 A * | 10/2000 | Smith | ................... | B60G 15/067 267/220 |
| 7,331,611 B2 * | 2/2008 | Kusu | ..................... | B60K 13/04 180/309 |
| 2007/0096420 A1 * | 5/2007 | Lounsberry | ............ | B60G 7/001 280/124.134 |
| 2012/0299263 A1 * | 11/2012 | Mielke | ................... | B60G 7/001 280/124.134 |

(Continued)

FOREIGN PATENT DOCUMENTS

| | | |
|---|---|---|
| DE | 602005003264 | 9/2008 |
| DE | 102009012551 | 9/2010 |

(Continued)

*Primary Examiner* — Darlene P Condra
(74) *Attorney, Agent, or Firm* — Jacobson Holman PLLC

(57) ABSTRACT

Motor vehicle control arm (1) comprising two profiles (2, 3) made from a metallic material, which are arranged at a distance opposite each other, and are connected to at least one plastic element (11) made from a fiber-reinforced plastic, wherein a plastic element (11) is designed in particular as a spring seat, which is designed to accommodate a motor vehicle spring.
Such a motor vehicle control arm (1) is optimized with respect to weight and costs.

10 Claims, 12 Drawing Sheets

(56) References Cited

U.S. PATENT DOCUMENTS

| | | | | |
|---|---|---|---|---|
| 2012/0299363 A1* | 11/2012 | Crum | ............... | A47C 1/0352 |
| | | | | 297/85 M |
| 2013/0175747 A1* | 7/2013 | Uemori | ............... | B60G 11/16 |
| | | | | 267/170 |
| 2014/0300074 A1* | 10/2014 | Koormann | ............ | B60G 7/001 |
| | | | | 280/124.151 |
| 2015/0008654 A1* | 1/2015 | Haselhorst | ............ | B60G 7/001 |
| | | | | 280/124.128 |
| 2017/0203624 A1* | 7/2017 | Mielke | ............... | B60G 7/02 |
| 2018/0111436 A1* | 4/2018 | Love | ............... | B60G 11/52 |
| 2019/0315173 A1* | 10/2019 | Kim | ............... | B60G 7/001 |

FOREIGN PATENT DOCUMENTS

| | | | | |
|---|---|---|---|---|
| DE | 102010051741 | | 5/2012 | |
| DE | 102011052398 A1 * | 2/2013 | ............ | F16F 1/3849 |
| DE | 102013007375 | | 3/2014 | |
| DE | 102013004352 | | 9/2014 | |
| DE | 102017107463 | | 5/2018 | |

* cited by examiner

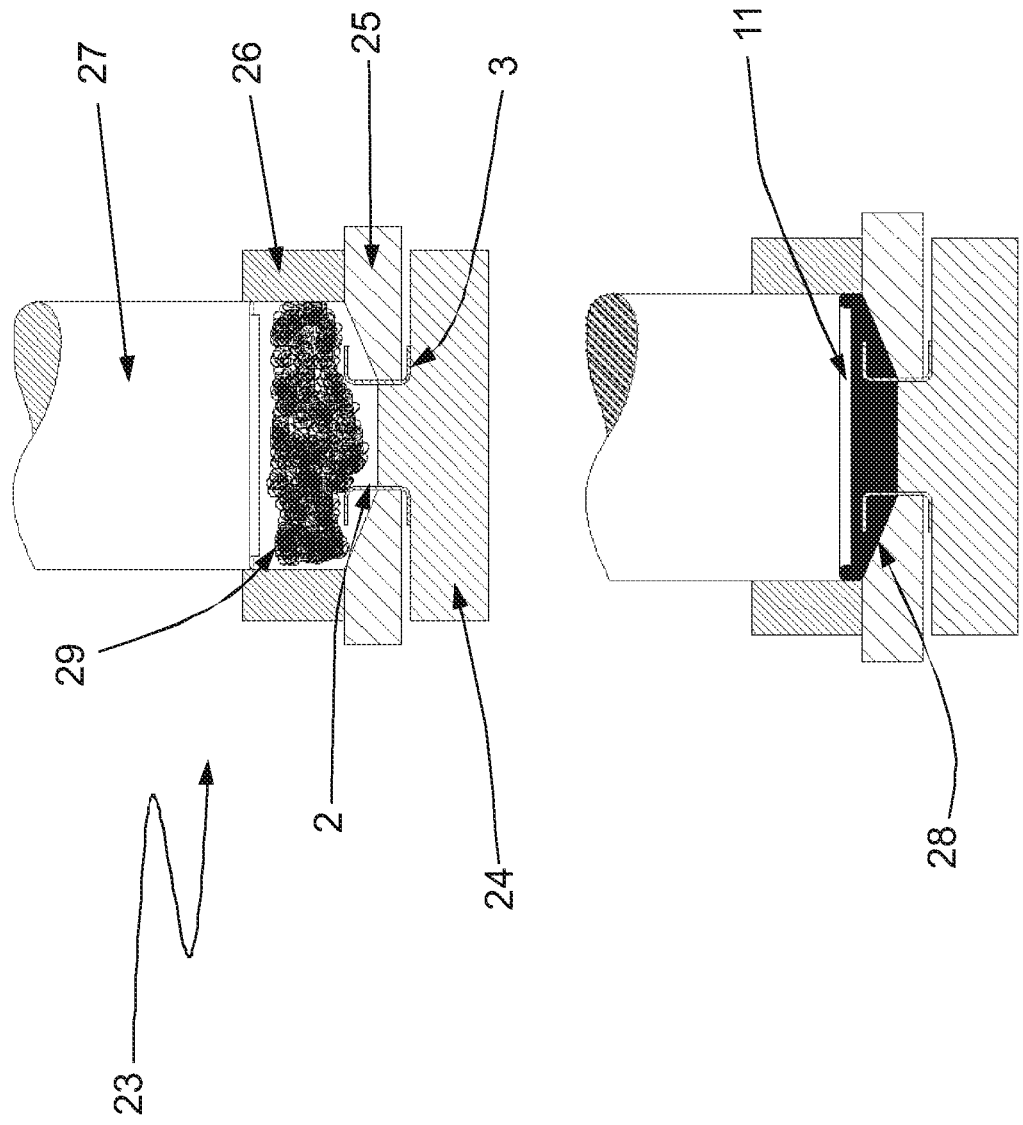

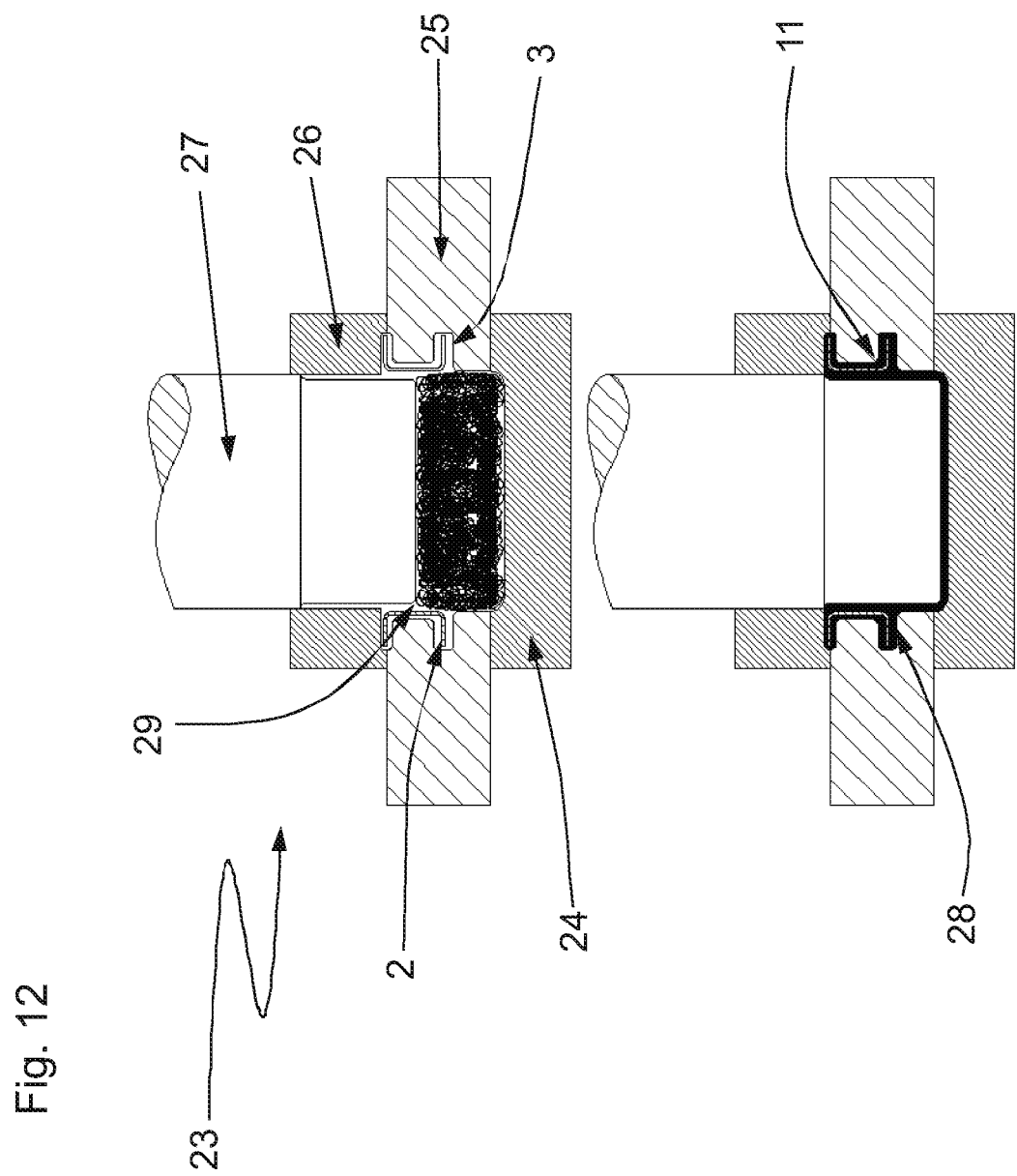

MOTOR VEHICLE CONTROL ARM

BACKGROUND OF THE INVENTION

The invention relates to a motor vehicle control arm.

Motor vehicle control arms, which are designed to include and support a vehicle spring, are commonly made from a steel alloy or an aluminum alloy.

In the prior art, for example, a motor vehicle control arm made from steel is known from DE 10 2009 012 551 A1.

A motor vehicle control arm made from aluminum or aluminum alloy is disclosed in DE 10 2010 051 741 A1.

While steel is characterized by high weight, aluminum or an alloy thereof has the disadvantage of high costs.

It is the objective of the invention to propose a motor vehicle control arm which is lightweight and at the same time cost-effective.

SUMMARY OF THE INVENTION

The invention relates to a motor vehicle control arm comprising two profiles made from a metallic material which are arranged opposite each other at a distance and are connected to each other by at least one plastic element made of fiber reinforced plastic, wherein a plastic element is designed as a spring seat to accommodate a motor vehicle spring.

The profiles can be made in a practically arbitrary manner from steel or aluminum. Here and in the following, the term "aluminum" always includes the meaning of "aluminum alloy." For example, the profiles can be designed as sheet metal parts or extruded parts. Preferably, steel alloys with a yield strength of about 800 MPa are used. The steel sheet is advantageously provided with a zinc coating, which protects against corrosion.

Because the complete control arm is no longer formed in metal, but a part is replaced by a fiber-reinforced plastic, weight benefits result. Due to the lower material consumption, the control arm is also cheaper. The necessary forming tools are also simpler and more cost effective, because no complex metal handling must be carried out.

The profiles can be equipped with reinforcing beads, and recesses for further weight savings are possible as well. Wall thicknesses can also be designed variably, and high wall thicknesses must be provided only where they are necessary for technical reasons. For example, the profiles can have locally differing wall thicknesses. The wall thicknesses of the individual profiles may also differ from one another.

Additionally, due to the connection of both profiles via the plastic element, no welding processes are necessary here, so that the material is not weakened by the heat entering thereby. Corrosion protection by zinc coating is also not impaired.

Additional functions can be integrated into the plastic element that can be formed in an arbitrary fashion. For example, an underride protection can be formed, or connection points or sensor holders can be formed.

Fiber optic, carbon fiber, and any additional fiber material can be used here as a fiber material. Thermoplastic synthetics such as polypropylene or polyamide are preferably provided for the matrix.

Finally, a corrosion protection layer is applied in a preferred manner. For example, this may be a KTL coating.

In a preferred manner, it is provided that the profiles are connected to each other on their upper longitudinal edge and/or their lower longitudinal edge by the at least one plastic element. The terms "top", and "bottom" refer to the installation position.

Depending on whether the upper or lower longitudinal ends of the profiles are connected, the plastic element forms a high or a low spring seat. The design depends on the desired kinematics, the construction space, and other boundary conditions of the respective individual case. In doing so, the profiles are advantageously connected by their upper longitudinal edge and/or their lower longitudinal edge, so that the area between the profiles remains largely free.

If the upper and lower longitudinal ends of the profiles are connected to each other, a box-shaped arrangement with particularly high rigidity is obtained.

The rigidity of the control arm can be varied by the design and arrangement of the plastic element. Here, the plastic element can extend over the entire length of the metal profiles or only over a section thereof. Plastic elements at the upper and lower longitudinal ends can extend over sections of the profiles having a different length or be arranged on different positions in the longitudinal direction of the profiles.

A further advantageous embodiment of the invention provides that the profiles have a side wall, on the longitudinal edge of which flanges extend at an angle, with flanges of the first profile and the second profile preferably pointing away from each other.

The profiles therefore have a substantially U-shaped configuration in the cross section. The flanges serve to reinforce the control arm. They can also be arranged over the entire longitudinal side of the profiles or only a section thereof.

Preferably, the motor vehicle control arm is designed in such a way that the at least one plastic element is connected to the profiles in a form-fitting and/or material-bound fashion.

It is particularly preferred that at least one plastic element encompasses the flanges of the profiles on their upper longitudinal edge and/or their lower longitudinal edge.

Such an encompassing element can be easily produced in an injection molding or impact extrusion process. In order to improve the form-fit, the edges of the flange can also have indentations, spikes, cams, or other forms that support the fixation of the plastic element on the flanges.

In addition, the profiles preferably have recesses of the first type, which are engaged by the at least one plastic element.

Preferably, the recesses of the first type are arranged in the flanges. However, they can also be arranged in combination or exclusively in the side walls. Here, the plastic material can also flow through the recesses of the first type during the production of the plastic element, for example in an injection of casting mold. The resulting undercut leads to a stable connection between metal profiles and plastic elements.

Furthermore, it is an advantageous further development of the invention if at least one plastic element is connected to the profiles by a bonding agent or adhesive.

For example, a bonding agent is applied prior to the casting or pressing generation of the plastic element in order to improve the connection between plastic material and profile surface. The adhesion agent is preferably a plasma coating. Here, the surface is first cleaned by a plasma and coated in a subsequent step.

A plastic element can also be manufactured as a separate component and then connected to the metal profiles by way of adhesion technology.

In a further embodiment of the invention, it is provided that the plastic element formed as a spring seat comprises a receiving element for the end of a motor vehicle spring. The receiving element can be designed as a receptacle for a spiral spring, in particular a spiral spring made of steel, as well as for a pneumatic spring. The motor vehicle spring can be arranged in a fixed fashion in the receiving element in order to allow a stable support of the spring on the control arm.

Here, the plastic element designed as a spring seat preferably comprises devices, by means of which the receiving element can be arranged on the plastic element.

These devices can, for example, be recesses that are inserted into the spring seat. The receiving element is a separate component in this embodiment, which is designed for housing a respective spring type. The receiving element has projections on its side facing the spring seat, which are inserted into the corresponding recesses. For example, the receiving element is defined in the recesses, for example, in a material-to-material and/or form-fitting manner, for example, clinched or glued. It can also be held in a fixed fashion by the spring tension applied during the assembly.

Because the receiving elements for air and steel springs are mostly designed differently and attached to different positions on the spring seat, recesses for both spring types can be provided in the plastic part. As a result, identical base bodies of the motor vehicle control arm can be used for various spring types. The receiving elements can also be adapted to different embodiments of steel springs or pneumatic springs.

In a further design variant, it is provided that the receiving element is designed as a single piece and is materially uniform with the plastic element designed as a spring seat. This saves a separate production step to connect the seat and the spring seat. Here, too, the seat and its positioning can be adapted to the spring to be used as described above.

Advantageously, in a motor vehicle control arm according to the invention, the profiles each have at least one penetration, which is designed to receive a rubber bearing or rubber metal bearing or another connecting bearing. The penetrations of the respective profiles intended for receiving a rubber bearing or rubber metal bearing or a different connection bearing are aligned with each other. The rubber bearings (here synonymously used for other bearing types) are pressed in, which avoids a weld seam and a resulting material weakening.

In addition, there are additional openings or penetrations that enable the connection of a damper or the connection of the control arm directly to the body or wheel mount, for example by a bolt or the like.

Preferably, the two penetrations of the profiles that are allocated to each other, which are provided for receiving a rubber bearing, each have a collar, wherein the collars are arranged in particular facing each other. The collars form perforations in which the rubber bearing rests in a press fit. In addition, the collars support the rubber bearing, which is impressed under pretension, and thus presses its rubber portion in a radial direction to the outside.

If the collars are spaced apart from each other, there is a risk that the rubber bearing is only widened in the gap between the collars and thus becomes impaired in its function. Therefore, the collars with a rubber bearing arranged therein are preferably surrounded by a support element preferably made from fiber-reinforced plastic. The support element can be formed in an injection molding or casting process or by another method.

Another embodiment of the invention provides for the profiles to show recesses of a second type, which are engaged by the support element to form a positive connection. In an analogous manner, as described above for the plastic element, an undercut is generated by the engagement, which leads to a stable connection between metal profiles and plastic elements.

It is also advantageous if the support element is formed as a single piece and is materially uniform with at least one of the plastic elements. The support element can then be manufactured simultaneously with the plastic element and a work step can be saved.

It is also possible to produce a complete belt, comprising the upper side, the lower side, and the area of the penetration. A maximum reinforcement effect of the plastic element can thus be obtained.

Alternatively, the support element can also be connected to the plastic element(s) by a rib or a similar element.

Another embodiment of the invention provides for an air deflection element being formed as a single piece and in a materially uniform fashion with at least one plastic element. The air deflection elements serve to guide the headwind around the control arm. They can also be designed as an underride protection. Usually, they are screwed into a motor vehicle control arm as a separate part. The single piece and materially uniform design is obtained here in that the air deflection element is simultaneously produced with at least one plastic element. As a result, the manufacturing process is further streamlined, and additional steps are avoided.

When producing a motor vehicle control arm according to the invention, two profiles are provided, made from a metallic material. The profiles can be made of aluminum, an aluminum alloy, or a steel alloy. This can be sheet metal parts or, in particular in case of aluminum, extruded parts.

In the case of sheet metal parts, the metal profiles allocated to each other can be produced simultaneously in a forming process.

If necessary, the semi-finished products that have been formed this way can still be mechanically processed after reforming or extrusion. The profiles can be equipped with reinforcement beads and equipped with recesses required for connections or serving for weight savings. Likewise, recesses can be generated on which at least one plastic element is fastened by way of an undercut.

There are several possibilities for the connection with the at least one plastic element.

In a first variant, the plastic element can be manufactured in a separate work step and subsequently attached to the profiles in a material-to-material fashion, in particular glued.

In a second variant, at least one plastic element is preferably molded into the metal profiles in an injection molding or casting process. Two corresponding profiles are inserted into a tool and the one or more plastic elements are generated in an injection molded or casting fashion, wherein simultaneously a permanent connection between the metal profiles and the at least one plastic element is produced. This can, for example, be done by a bonding agent and/or by a form-fitting connection, for example an undercut in at least one spatial direction, which can be recesses in the metal profiles or by encompassing the flanges.

Here, a plastic element is designed as a spring seat. Devices can be provided that allow the mounting of a seat element for the end of a motor vehicle spring. These devices can, for example, be recesses in the spring seat, into which the receiver element is inserted by means of projections formed thereupon. Or, this receptacle element is formed as a single piece and materially uniform with the spring seat.

Preferably, the profiles, especially during their manufacture, are equipped with penetrations for accepting rubber bearings or rubber metal bearings or other connection bearings. It is particularly preferred that collars are adjusted at the penetrations, which face each other at the finished control arm.

The penetrations aligned with each other form a seat for a rubber bearing. The rubber bearing is pressed into this receptacle. Finally, a support element made preferably from fiber-reinforced plastic is advantageously formed around the collars in order to additionally support the rubber bearing.

This rubber bearing connection can simultaneously be generated with at least one plastic part in a tool, but also independently thereof in a further processing step before or after the preparation of at least one plastic part.

DESCRIPTION OF THE DRAWINGS

Additional features of the invention are derived from the following drawings. Here, identical elements or those performing the same functions are marked with the same reference characters.

The following are shown.

DETAILED DESCRIPTION OF THE INVENTION

Figure 1:
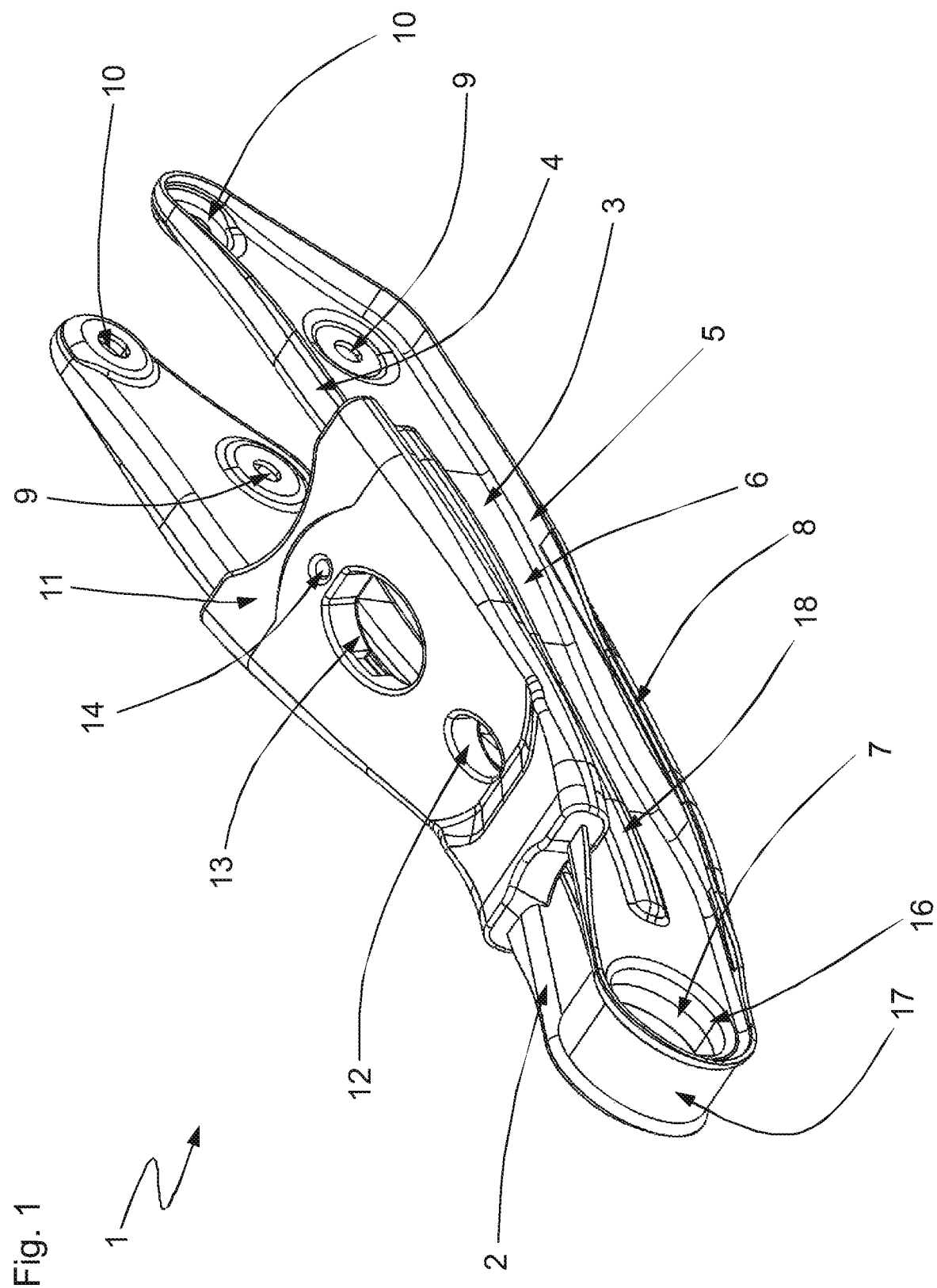
FIG. 1 a first embodiment of a motor vehicle control arm according to the invention, FIG. 2 the profiles of the first embodiment made of metallic material, FIG. 3 the first embodiment with a receiver element for the end of a motor vehicle spring, FIG. 4 the first embodiment with an air deflection element, FIG. 5 the first embodiment in a view from below, FIG. 6 a second embodiment of a motor vehicle control arm according to the invention, FIG. 7 profiles made of metallic material of the second embodiment, FIG. 8 the second embodiment with a receiver element for the end of a motor vehicle spring, FIG. 9 the second embodiment with an air deflection element, FIG. 10 the second embodiment in a view from below, FIG. 11 a first embodiment of a tool for producing a motor vehicle control arm according to the invention, FIG. 12 a second embodiment of a tool for producing a motor vehicle control arm according to the invention.

FIG. 1 shows a first embodiment of a motor vehicle control arm 1, according to the invention. It has a first and second profile 2, 3 made from a metallic material. The material is a steel alloy with a yield strength of 780 MPa. Profiles 2, 3 are embodied as sheet metal parts. They respectively have a first flange 4 on their upper longitudinal edge and a second flange 5 on their lower longitudinal edge. The flanges 4, 5 are provided at an angle in reference to a side wall 6 of the profiles 2, 3.

The flanges 4, 5 extend substantially over the entire length of the motor vehicle control arm 1; only in the area of penetrations 7 designed for accepting a rubber bearing is no flange 4, 5 formed at these sections. In this embodiment, the second flange 5 is equipped with an additional angular offset 8 on the lower longitudinal edge, which has a direction towards the upper longitudinal edge.

Figure 2:
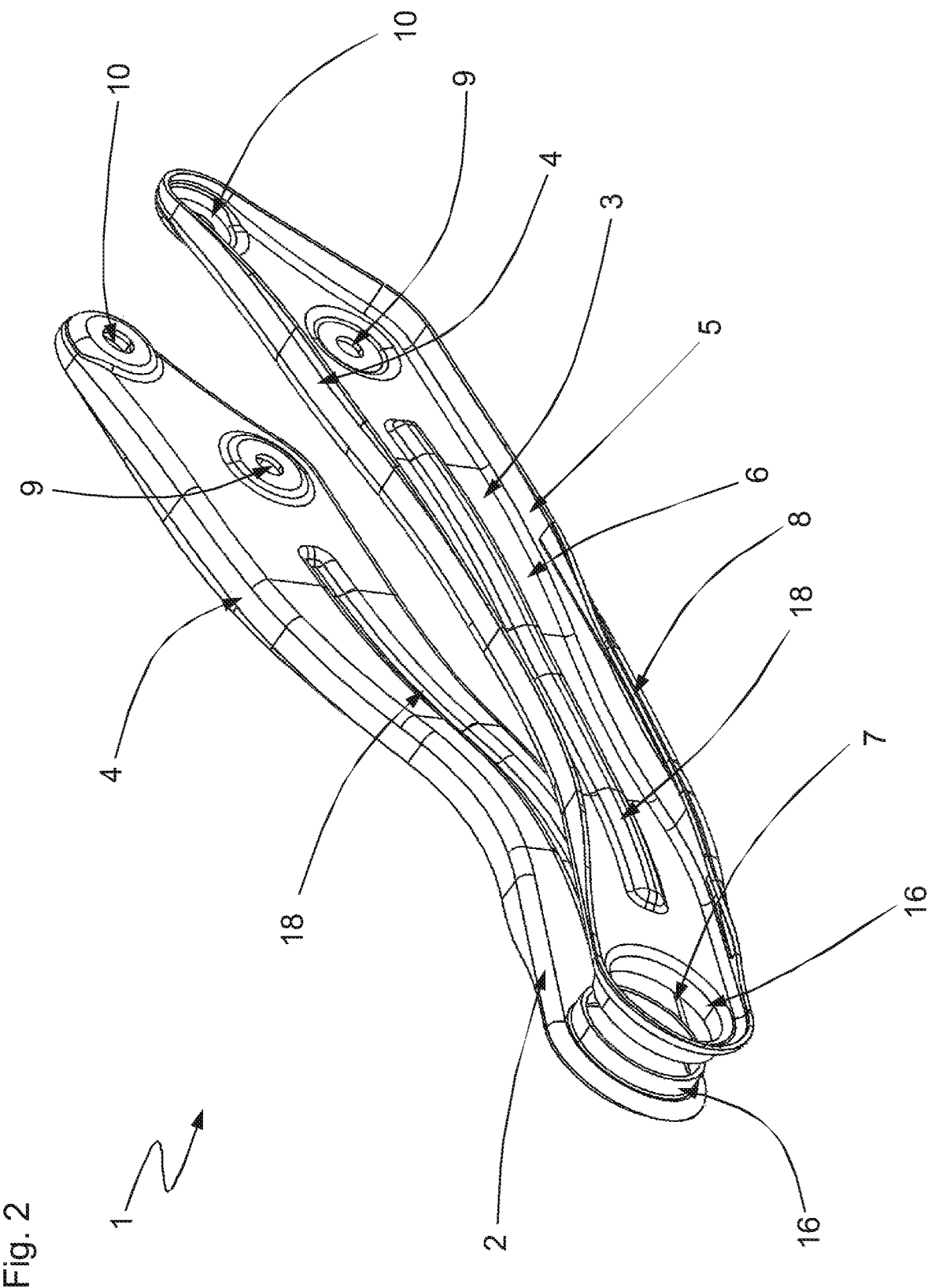

FIG. 2 shows the two profiles 2, 3 without a plastic element 11 or a support element 17. Here, it is shown once more that the profiles 2, 3 are produced in a mirror-symmetrical fashion. During the production, two profiles 2, 3 allocated to each other can always be produced simulta-neously. In addition, the beads 18 which serve as reinforcements for the motor vehicle control arm 1 are clearly discernible here.

In addition to the already mentioned penetrations 7 to accommodate a rubber bearing, the profiles 2, 3 also have further openings 9, 10, which serve to connect to a damper element or to another vehicle component.

Figure 3:
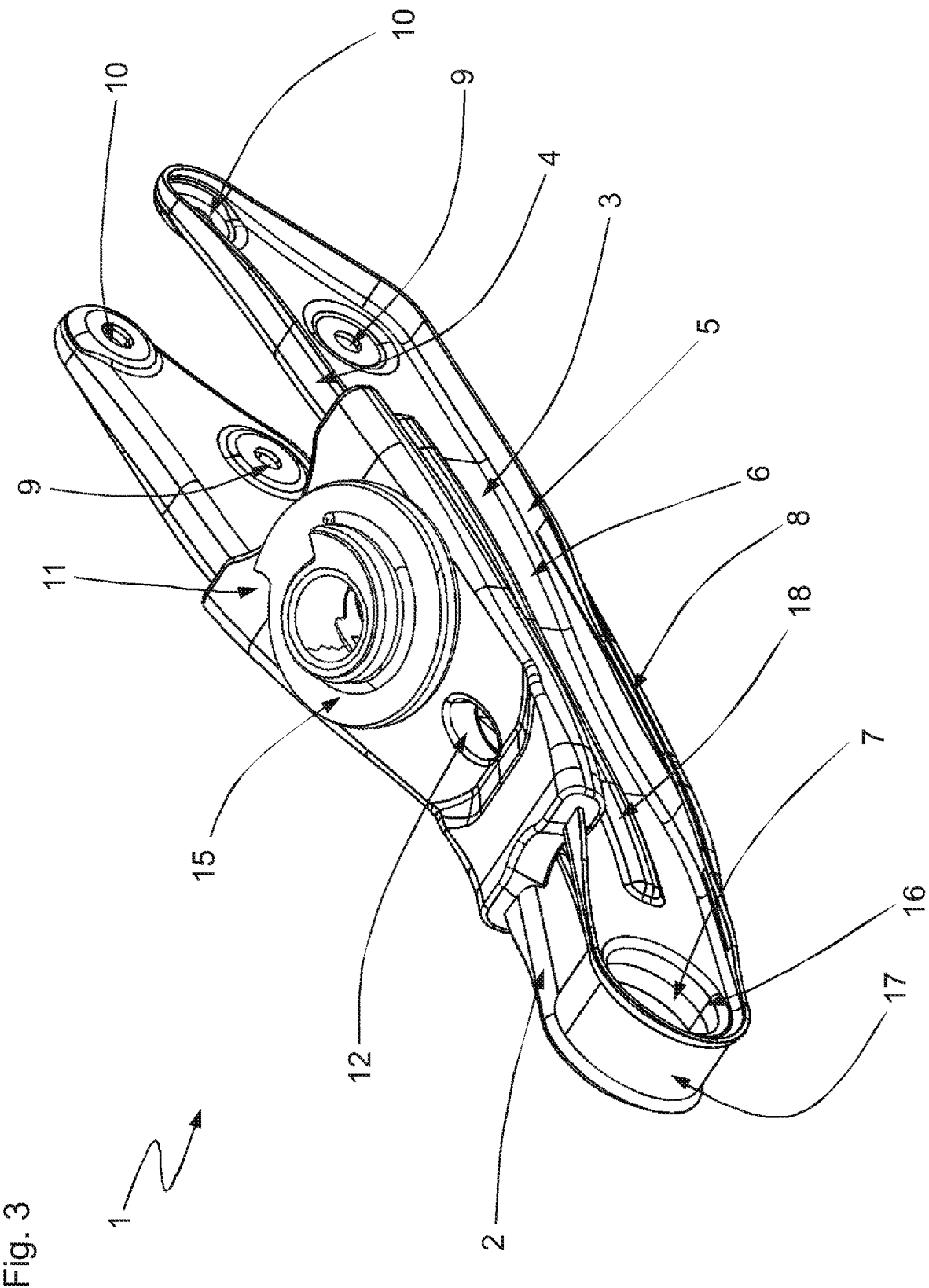

The profiles 2, 3 are connected by a plastic element 11 as seen in FIG. 3 made of fiber-reinforced plastic, which is designed to enable receiving a motor vehicle spring as a spring seat. The plastic element 11 is made from carbon fibers in a matrix made of polyamide.

The plastic element 11 engages the first flange 4 on the upper longitudinal edge of the profiles 2, 3. The profiles 2, 3 have been equipped with a bonding agent to create a material-locking connection between the profiles 2, 3 and the plastic element 11.

The plastic element 11 comprises three recesses 12, 13, 14, which are designed to accommodate a receiving element 15 for an end of a vehicle spring. The vehicle spring can be a pneumatic spring, but also a spiral spring, wherein the respective receiving elements 15 are designed differently. The plastic element 11 is now designed in such a way that different receiving elements 15 can be arranged on it. As shown in FIG. 3, a receiving element 15 is arranged for a spiral spring made of steel in the second and third recess 13, 14. In the finished assembly, the first recess 12 would be equipped with a cover. A receiving element 15, which is not shown in greater detail, for a pneumatic spring would be arranged in the first and second recess 12, 13, wherein the third recess 14 would be equipped with a cover. It is therefore possible to cover several variants of a motor vehicle control arm 1 with a basic component, which is supplemented depending on the intended use.

In addition, it is also possible to form the receiving element 15 in a materially uniform and single piece with the plastic element 11. This saves a processing step during assembly.

Figure 5:
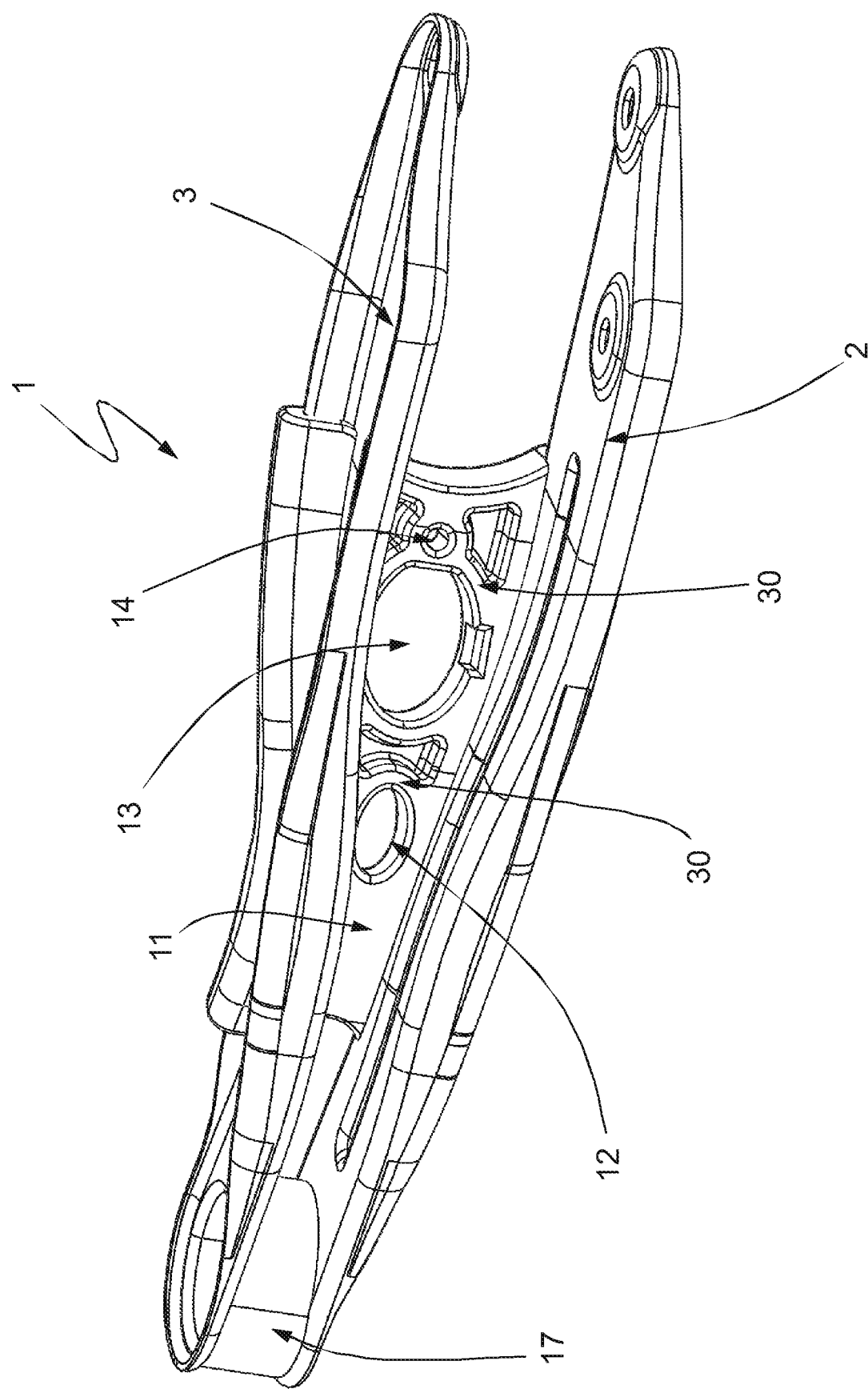
Figure 6:
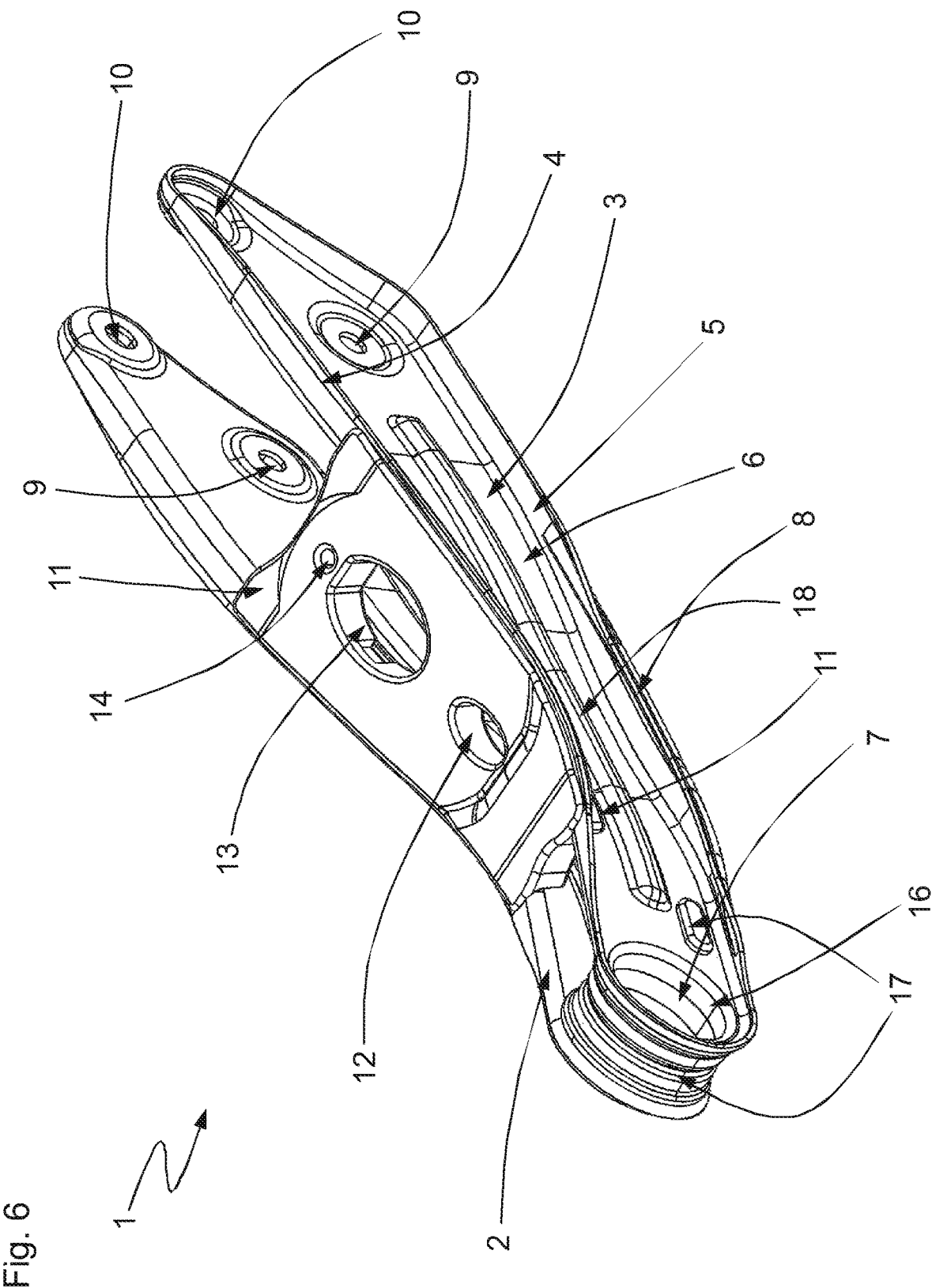

FIG. 5 shows a view of the motor vehicle control arm from below. A rib structure 30 is discernible on the underside of the plastic element 11, which optimizes the plastic element with regard to weight and rigidity.

The collars 16 are formed on the penetrations 7 of the profiles 2, 3 provided for the seat of a rubber bearing, wherein the collars 16 are arranged facing each other. The collars 16 form a seat for the rubber bearings, not shown in greater detail. Usually, this is radially compressed and then inserted into the seat. Then, the rubber bearing relaxes again and forms a press-fit connection with the profiles 2, 3. If the collars 16 are spaced apart from each other, the rubber bearing can expand in the clear space between the sleeves 16, which is detrimental to the function and service life of the bearings and the control arm 1. To prevent this, the collars 16 are surrounded by a support element 17 in a ring-shaped manner. The support element 17 is likewise formed from fiber-reinforced plastic and can be produced simultaneously or with the plastic element 11 or temporarily offset from it.

Figure 4:
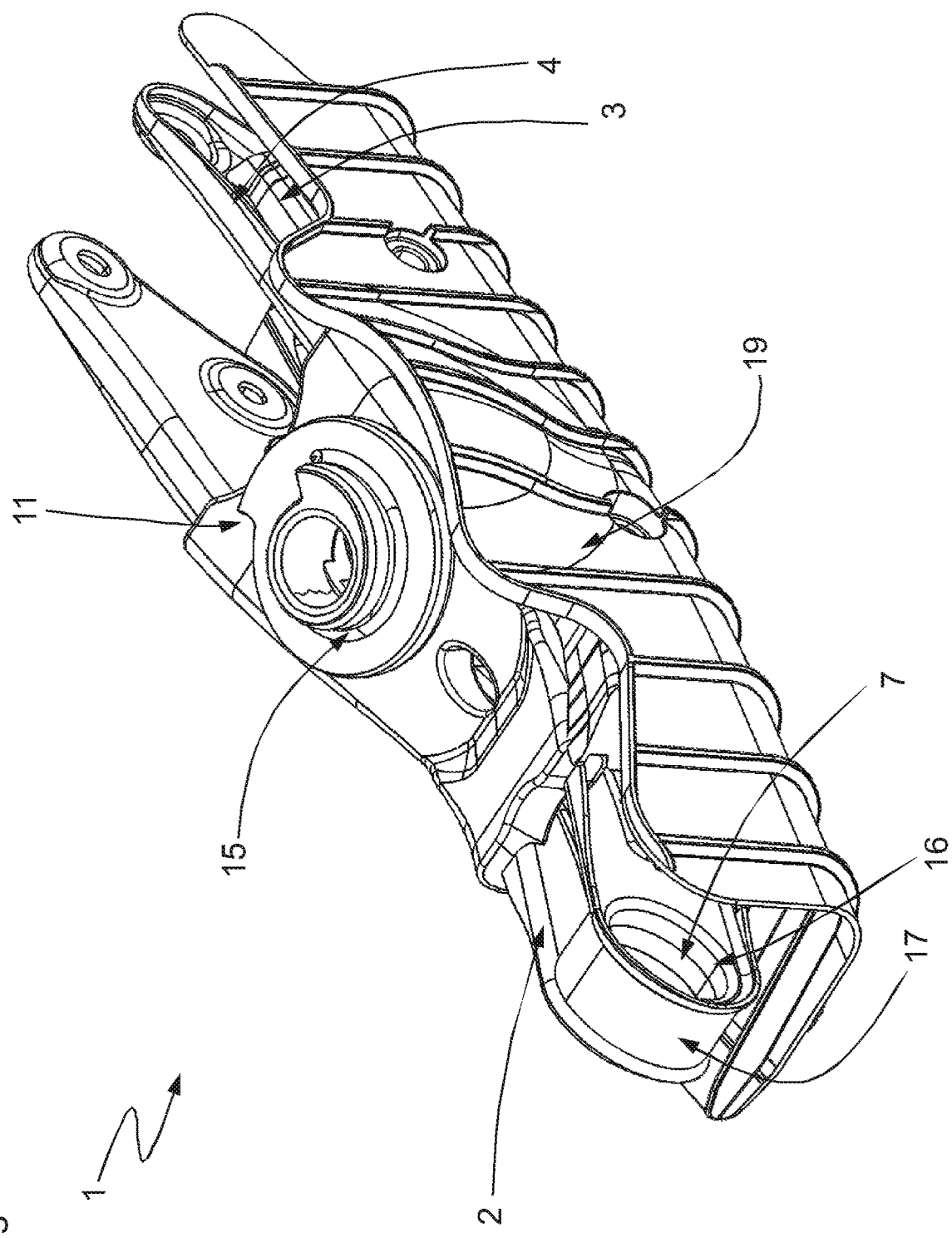

FIG. 4 represents an expanded embodiment of the motor vehicle control arm 1 presented above. In this embodiment, the motor vehicle control arm 1 is equipped with an air deflection element 19, with the help of which the headwind is guided around the control arm 1 and which can additionally serve as a underride protection.

FIGS. 6 to 10 present a second embodiment for a motor vehicle control arm 1 according to the invention. The basic structure of the second embodiment is the same as in the first embodiment; the individual components differ in details from the control arm—concept shown in FIGS. 1 to 5.

Figure 7:
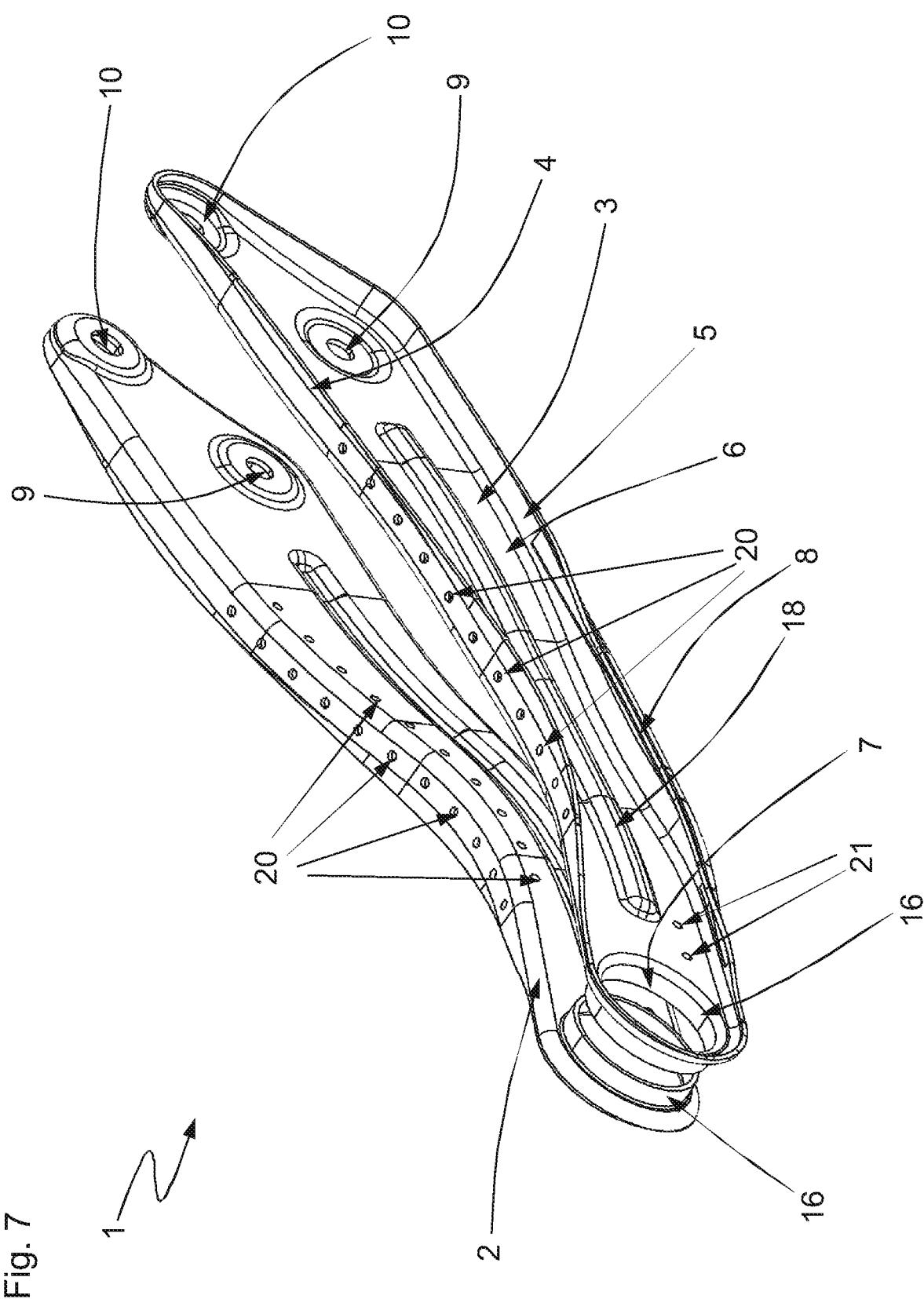
Figure 8:
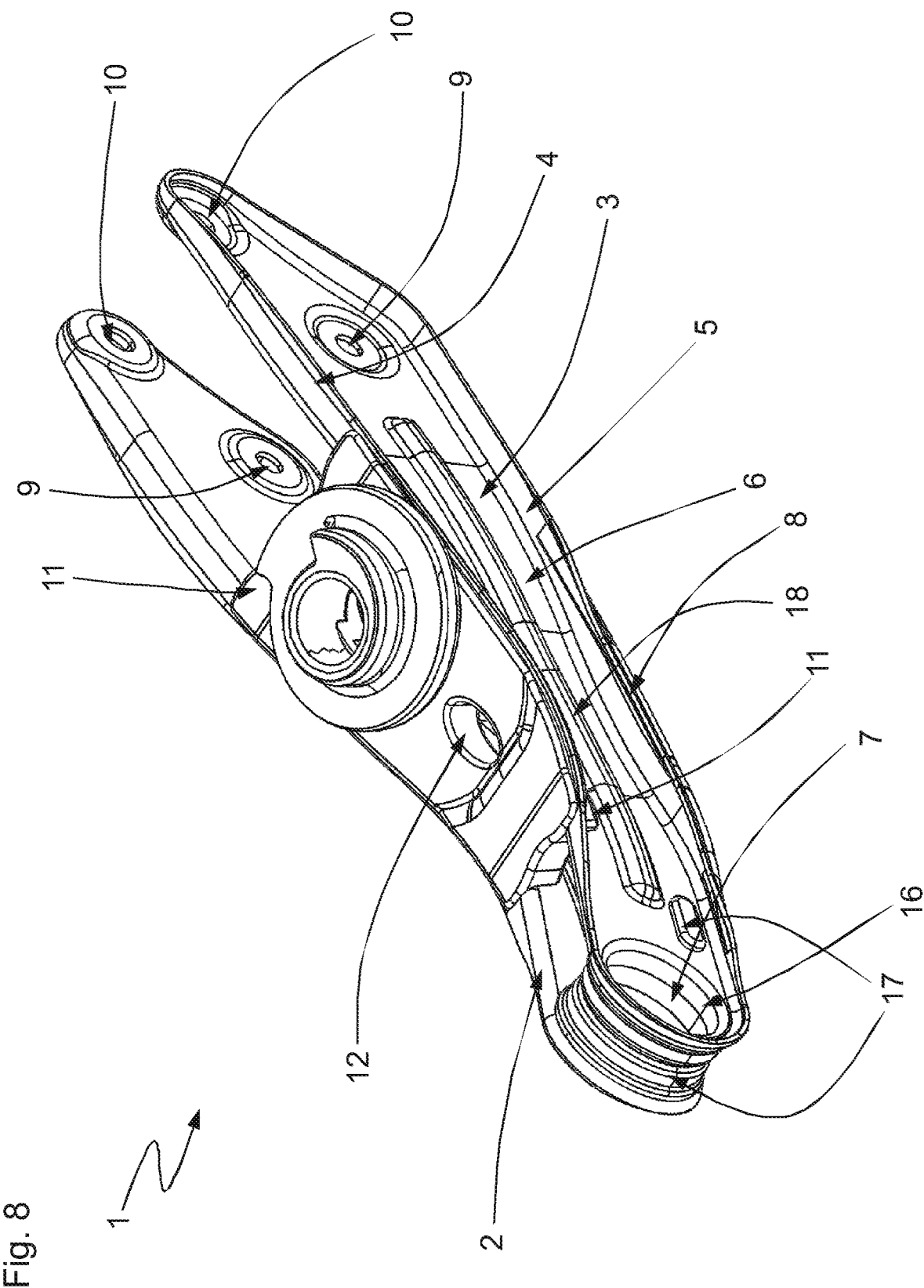
Figure 9:
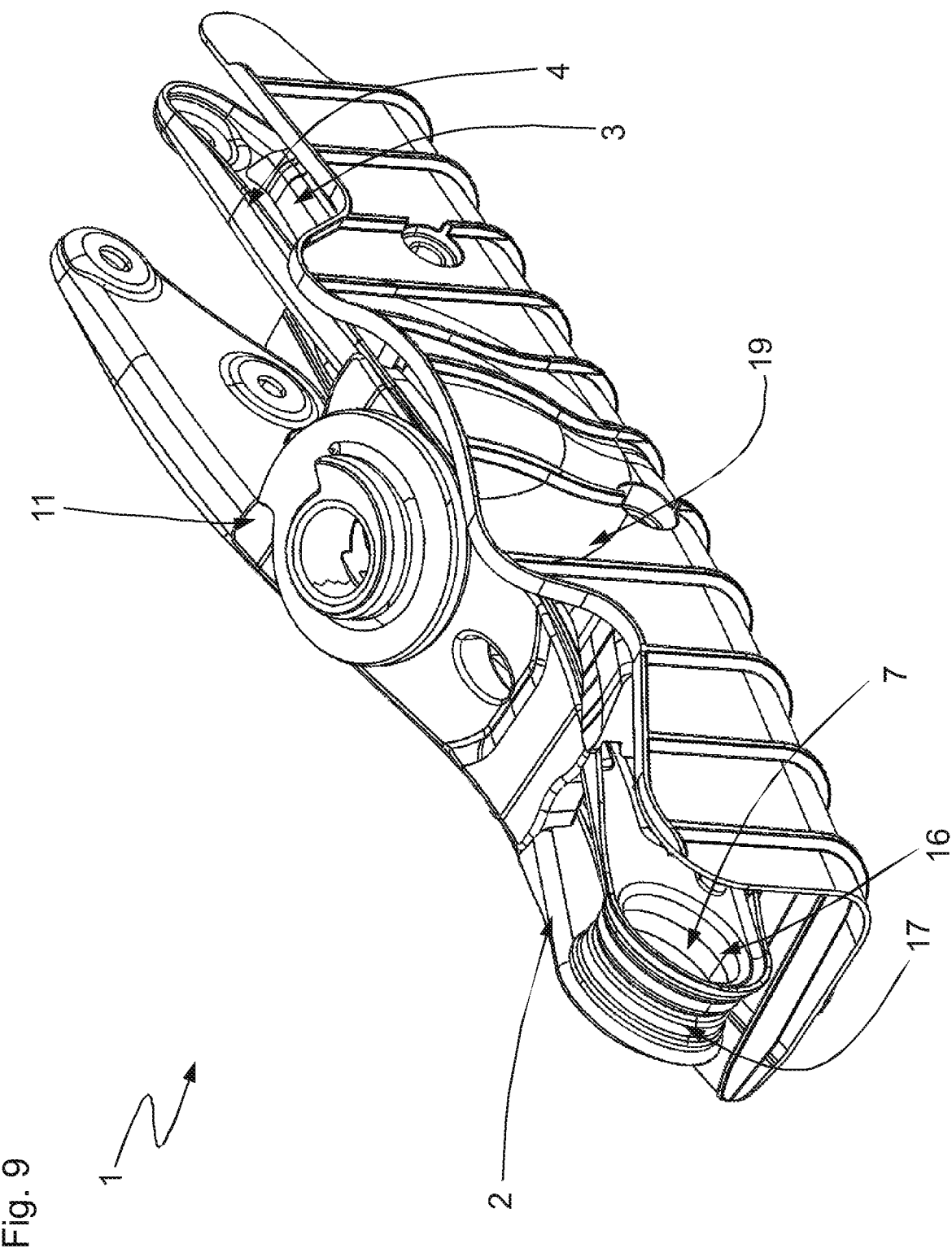

The motor vehicle control arm 1 shown here also comprises two profiles 2, 3 made from metallic material. Profiles 2, 3 are equipped with a first and a second flange 4, 5 on their longitudinal edges. FIG. 7 shows recesses of a first type 20, which are formed both in the flanges 4, 5 and in the side walls 6 of the profiles 2, 3. Recesses of a second type 21 are formed adjacent to the penetrations 7 for receiving the rubber bearings. The recesses of the first type 20 are designed to be engaged by the plastic element 11 and thus to create a form-fitting connection with the profiles 2, 3. The recesses of the second type 21 are designed to be engaged by the support element 17 and thus to create a form-fitting connection with the profiles 2, 3.

Figure 10:
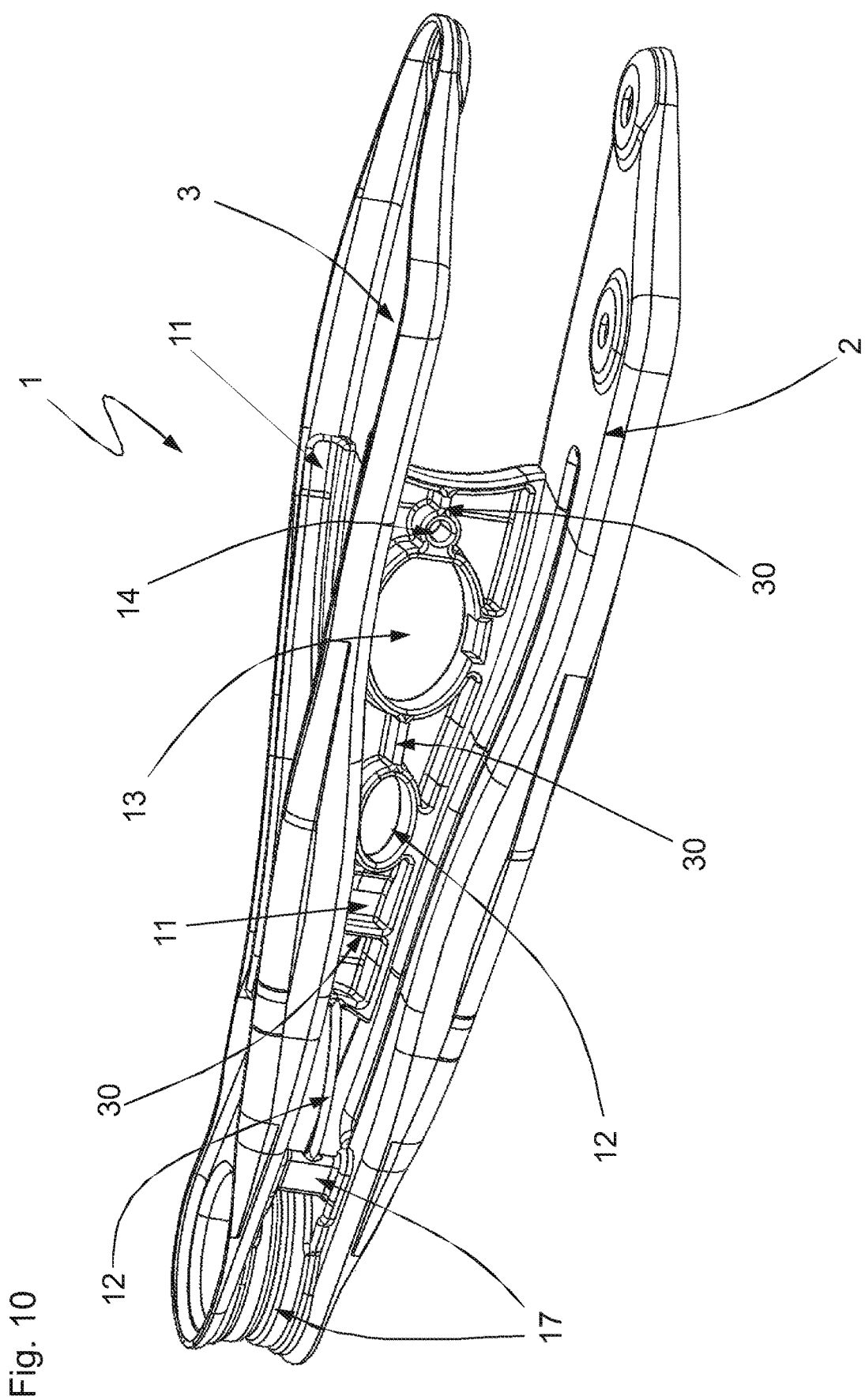

The view of the motor vehicle control arm 1 from below in FIG. 10 discloses a more intricate rib structure 30 of the plastic element 11 than in the first embodiment discussed above. A further difference is a connecting element 22, by which the support element 17 is connected to the plastic element 11 in one piece and in a material-uniform manner.

Beyond this, the components of the first and second embodiment are identical, so that reference is made to the above explanations.

A possible manufacturing method for a motor vehicle control arm 1 according to the invention is a casting method or injection molding process.

FIG. 11 shows the production of a motor vehicle control arm 1 in a casting method. A motor vehicle control arm 1 is produced, comprising two profiles 2, 3 from a metallic material which is connected through a plastic element 11. The plastic element 11 is arranged here in such a way that profiles 2, 3 are connected to each other on their upper longitudinal edge.

A mold tool 23 is used here, whose tool components 24, 25, 26 form a mold cavity 28 together with a plunger 27. The inner wall of this mold cavity 28 corresponds in the closed state of the mold tool 23 to the outer contour of the plastic element 11.

In addition to the mold cavity 28 for the plastic element 11, a further molded cavity, not shown, for a support element 17 can also be provided here.

Two prefabricated profiles 2, 3 are inserted into the mold tool 23. Fiber material 29 containing carbon fibers, polyamide or polypropylene as a matrix material is inserted above the profiles 2, 3 into the forming tool 23. The top of FIG. 11 shows this condition with the opened mold tool 23. The temperature of the fiber material 29 must be higher at the start of the forming process than the melting temperature of the matrix material. Heating can occur before, during, or after insertion into the mold tool 23. The mold tool 23 is then closed, and the fiber material is pressed into the mold cavity 28 with the plunger 27. The plastic element 11 is formed as shown in FIG. 11 below. Here, the fiber material 29 encases the first flange 4 at the upper longitudinal edge of the profile 2, 3 such that the plastic element 11 encompasses this first flange 4.

FIG. 12 shows an analogous procedure for producing a plastic element 11 with another arrangement and form.

In contrast to the embodiments of a control arm 1 according to the invention shown previously, this plastic element 11 is constructed such that it connects both profiles 2, 3 at their lower longitudinal edge. A deep spring seat is thus formed, and the vehicle spring protrudes between two profiles 2, 3. The features described in the first two embodiments within the scope of FIGS. 1 to 10 can be easily transferred to this embodiment, so that here reference is made thereto.

Here, the profiles 2, 3, and the fiber material 29 are inserted into the mold tool 23 (FIG. 12 above) and this is closed. The tool components 24, 25, 26 together with the plunger 27 form a mold cavity 28, whose inner wall corresponds in the closed state of the forming tool 23 to the outer contour of the plastic element 11.

The heated fiber material 29 flows into the mold cavity and forms the plastic element 11, as shown in FIG. 12 below. This is designed in such a way that it encompasses both the first flange 4 on the upper longitudinal end and the second flange 5 on the lower longitudinal end of the profiles 2, 3.

The profiles 2, 3 in this exemplary embodiment are therefore fully embedded in the plastic element 11.

An injection molding process is carried out in a similar manner. Profiles 2, 3 are inserted into a mold tool and this is then closed. However, the fiber material 29 is injected from outside into the mold cavity formed by the mold tool.

REFERENCE NUMBERS

1 Motor vehicle control arm
2 First profile
3 Second profile
4 First flange
5 Second flange
6 Side wall
7 Penetration
8 Angular offset
9 Opening
10 Opening
11 Plastic element
12 First recess
13 Second recess
14 Third recess
15 Receiving element
16 Collar
17 Support element
18 Bead
19 Air deflection element
20 Recesses of the first type
21 Recesses of the second type
22 Connecting element
23 Mold tool
24 Tool component
25 Tool component
26 Tool component
27 Plunger
28 Mold cavity
29 Fiber material
30 Rib structure

The invention claimed is:

1. A motor vehicle control arm comprising two profiles made from a metallic material, which are arranged at a distance opposite each other, and are connected to at least one plastic element made from a fiber-reinforced plastic, wherein the at least one plastic element is designed as a spring seat, which is designed to accommodate a motor vehicle spring, wherein the two profiles each have at least one penetration that is designated to accommodate a rubber bearing or a rubber metal bearing or another type of connection bearing, wherein the at least one penetration of the two profiles allocated to each other each have a collar, wherein the collars are in particular arranged parallel to each other, wherein the collars are surrounded by a rubber bearing with a support element arranged therein made from fiber-reinforced plastic, wherein the two profiles have recesses of a first and a second type, which are engaged by the support element to form a form-fitting connection, wherein the support element is configured as a single piece and materially uniform with at least one of the at least one plastic elements, and wherein an air deflection element is configured as a single piece and is materially uniform with the at least one plastic element.

2. The motor vehicle control arm according to claim 1, wherein the profiles are connected to each other on their upper longitudinal edge and/or lower longitudinal edge by the at least one plastic element.

3. The motor vehicle control arm according to claim 1, wherein the two profiles have a side wall which is angled at the longitudinal edge with flanges, wherein the flanges of a first profile and a second profile are pointing away from each other.

4. The motor vehicle control arm according to claim 1, wherein the at least one plastic element is connected to the two profiles in a form-fitting or material-binding manner.

5. The motor vehicle control arm according to claim 4, wherein the at least one plastic element encompasses flanges profiles on their upper longitudinal edge or their lower longitudinal edge.

6. The motor vehicle control arm according to claim 4, wherein the two profiles have recesses of the first type which are engaged by the at least one plastic element.

7. The motor vehicle control arm according to claim 4, wherein the at least one plastic element is connected to the two profiles by a bonding agent or adhesive.

8. The motor vehicle control arm according to claim 1, wherein the plastic element is formed as a spring seat comprises a receiving element for the end of a motor vehicle spring.

9. The motor vehicle control arm according to claim 8, wherein the plastic element embodied as a spring seat comprises devices, by means of which the receiving element can be arranged on the spring seat.

10. The motor vehicle control arm according to claim 8, wherein the receiving element is designed as a materially uniform single piece on the at least one plastic element designed as the spring seat.

* * * * *